United States Patent
Suzuki et al.

(10) Patent No.: US 8,734,574 B2
(45) Date of Patent: May 27, 2014

(54) GAS SEPARATION MEMBRANE

(75) Inventors: Tomoyuki Suzuki, Ogaki (JP); Yasuharu Yamada, Kyoto (JP)

(73) Assignees: Ibiden Co., Ltd., Ogaki-shi (JP); National University Corporation Kyoto Institute of Technology, Kyoto-shi (JP)

( * ) Notice: Subject to any disclaimer, the term of this patent is extended or adjusted under 35 U.S.C. 154(b) by 125 days.

(21) Appl. No.: 13/399,193

(22) Filed: Feb. 17, 2012

(65) Prior Publication Data

US 2012/0202953 A1 Aug. 9, 2012

Related U.S. Application Data

(63) Continuation of application No. PCT/JP2010/064506, filed on Aug. 26, 2010.

(30) Foreign Application Priority Data

Aug. 26, 2009 (JP) ................. 2009-195162

(51) Int. Cl.
- *B01D 53/22* (2006.01)
- *B01D 67/00* (2006.01)
- *B01D 71/64* (2006.01)
- *C08L 79/08* (2006.01)
- *C08G 73/10* (2006.01)

(52) U.S. Cl.
USPC ............. 96/4; 96/14; 95/51; 525/432; 528/26

(58) Field of Classification Search
USPC ................ 96/4, 11, 12, 13, 14; 95/45, 51; 525/432; 528/26

See application file for complete search history.

(56) References Cited

U.S. PATENT DOCUMENTS

| | | | |
|---|---|---|---|
| 8,167,983 B2* | 5/2012 | Seiler et al. ............. | 96/11 |
| 2007/0022877 A1* | 2/2007 | Marand et al. ............ | 95/51 |
| 2007/0149759 A1* | 6/2007 | Yamada et al. ............ | 528/310 |
| 2007/0270562 A1* | 11/2007 | Yamada et al. ............ | 528/26 |
| 2009/0318620 A1* | 12/2009 | Liu et al. ............... | 525/56 |
| 2010/0038306 A1* | 2/2010 | Livingston et al. ........ | 210/496 |

FOREIGN PATENT DOCUMENTS

| | | |
|---|---|---|
| CN | 1176844 A | 3/1998 |
| CN | 1375886 A | 10/2002 |
| CN | 1482941 A | 3/2004 |
| CN | 1993498 A | 7/2007 |
| JP | 10-99664 | 4/1998 |
| JP | 2006-131706 | 5/2006 |
| JP | 2006-326555 | 12/2006 |
| JP | 2007-246772 | 9/2007 |
| WO | WO 2006/025327 | 3/2006 |

OTHER PUBLICATIONS

International Search Report mailed Nov. 22, 2010, with English translation, issued for PCT/JP2010/064506, filed Aug. 26, 2010.

(Continued)

*Primary Examiner* — Jason M Greene
(74) *Attorney, Agent, or Firm* — Oblon, Spivak, McClelland, Maier & Neustadt, L.L.P.

(57) ABSTRACT

A gas separation membrane is provided which has both excellent gas permeability and gas separation characteristics, particularly permeability of carbon dioxide ($CO_2$) and separation characteristics of carbon dioxide and methane ($CH_4$), at such a high level that has not hitherto been achieved. The gas separation membrane was obtained by heat treating a membrane composed of a hyperbranched polyimide-based material in a non-oxidizing atmosphere.

20 Claims, 3 Drawing Sheets

X: Reactive residue (amino group or acid anhydride group)

Y: Triamine residue (imide bond as branch point)

(56) References Cited

OTHER PUBLICATIONS

Robeson, Lloyd M. "Correlation of separation factor versus permeability for polymeric membranes", Journal of Membrane Science, the Netherlands, Elsevier Science Publishers B V, vol. 62 (1991) pp. 165-185.

Robeson, Lloyd M. "The upper bound revisited", Journal of Membrane Science, the Netherlands, Elsevier Science Publishers B V, vol. 320 (2008) pp. 390-400.

* cited by examiner

FIG. 1

X: Reactive residue
(amino group or acid anhydride group)

Y: Triamine residue
(imide bond as branch point)

FIG. 2

X : Reactive residue
(amino group or acid anhydride group)

X' : Residue of alkoxy compound of Si
(crosslink point to inorganic oxide)

Y : Triamine residue
(imide bond as branch point)

FIG. 3

GAS SEPARATION MEMBRANE

CROSS REFERENCE TO RELATED APPLICATIONS

This application is a continuation of the International Application No. PCT/JP2010/064506 filed on Aug. 26, 2010, which is based upon and claims the benefit of priority to Japanese Patent Application No. 2009-195162, filed on Aug. 26, 2009. The entire contents of these applications are incorporated herein by reference.

TECHNICAL FIELD

The present invention relates to a gas separation membrane.

BACKGROUND ART

In recent years, study about separation and purification of a specific gas from a mixed gas using polymer membranes as gas separation membranes has been actively conducted. For example, attempts have been made to produce oxygen-enriched air and to make use of it in fields of medical care, fuel systems, and the like. Then, the gas separation membranes used for these applications are required to be high in both gas permeability and gas selectivity to the specific gas. Further, depending on the usage environment, it is also required to be excellent in heat resistance, chemical resistance, strength, and the like.

Under such circumstances, various gas separation membranes have hitherto been proposed. For example, Patent Document 1 (JP-A-10-99664) proposes a carbonized membrane for gas separation that is obtained by molding a cardo type polymer having a predetermined structural unit into a predetermined separation membrane form to form a separation membrane precursor, and heating this separation membrane precursor in an anaerobic atmosphere to carbonize it.

Meanwhile, for polymer membranes, there is a trade-off relation between the separation factor of two kinds of gases and the permeability coefficient, and the presence of an upper bound region has been advocated (see Non-Patent Documents 1 and 2).

Further, the present inventors have previously proposed a gas separation membrane composed of an organic-inorganic polymer hybrid having a hyperbranched polyimide moiety and an inorganic oxide moiety, which are integrated by a covalent bond to form a composite structure (see Patent Document 2).

Non-Patent Document 1: Lloyd M. Robeson, "Correlation of separation factor versus permeability for polymeric membranes", Journal of Membrane Science, the Netherlands, Elsevier Science Publishers B V, vol. 62 (1991) pp. 165-185

Non-Patent Document 2: Lloyd M. Robeson, "The upper bound revisited", Journal of Membrane Science, the Netherlands, Elsevier Science Publishers B V, vol. 320 (2008) pp. 390-400

SUMMARY OF INVENTION

The present invention has been made in the light of the situations described above. It is therefore an object of the present invention to provide a gas separation membrane having both excellent gas permeability and gas separation characteristics, particularly permeability of carbon dioxide ($CO_2$) and separation characteristics of carbon dioxide and methane ($CH_4$), at such a high level that has not hitherto been achieved.

The present inventors have conducted intensive studies, on the basis of the gas separation membrane proposed in Patent Document 2, and have found that a membrane obtained by heat treating a hyperbranched polyimide-based material can advantageously solve the above-mentioned problem, thus leading to completion of the present invention.

That is to say, the gist of the present invention is a gas separation membrane obtained by heat treating a membrane composed of a hyperbranched polyimide-based material in a non-oxidizing atmosphere.

According to a first preferred aspect of the gas separation membrane of the present invention, the hyperbranched polyimide-based material comprises a hyperbranched polyimide obtained by imidizing a hyperbranched polyamic acid having a hydroxyl group or an alkoxy group at least one of a plurality of ends thereof, and the hyperbranched polyamic acid is obtained by reacting: an aromatic tetracarboxylic dianhydride; an aromatic triamine; and an alkoxy compound of silicon, magnesium, aluminum, zirconium, or titanium, which has an amino group or a carboxyl group at an end, or a derivative of the alkoxy compound.

According to a second preferred aspect of the present invention, the hyperbranched polyimide-based material is a polymer blend of the hyperbranched polyimide and a straight-chain (linear) hydroxypolyimide.

According to a third preferred aspect of the present invention, the straight-chain hydroxypolyimide is obtained by polymerizing an aromatic tetracarboxylic dianhydride and 3,3'-dihydroxybenzidine.

According to a fourth preferred aspect of the present invention, the hyperbranched polyimide-based material comprises an organic-inorganic polymer hybrid having a composite structure that is obtained by integrating a hyperbranched polyimide moiety and an inorganic oxide moiety through covalent bond, the hyperbranched polyimide moiety having an imide structure that is produced by a reaction of an aromatic tetracarboxylic dianhydride and an aromatic triamine.

According to a fifth preferred aspect of the present invention, the organic-inorganic polymer hybrid is obtained by imidization of a reaction product that is obtained by sol-gel reaction, in the presence of water, of a hyperbranched polyamic acid having a hydroxyl group or an alkoxy group at least one of a plurality of ends thereof and at least one of alkoxides represented by the following formula, and the hyperbranched polyamic acid is obtained by reacting: an aromatic tetracarboxylic dianhydride; an aromatic triamine; and an alkoxy compound of silicon, magnesium, aluminum, zirconium, or titanium, which has an amino group or a carboxyl group at an end, or a derivative of the alkoxy compound.

$$R^1{}_m M(OR^2)_n \qquad \text{formula (1)}$$

where
$R^1$, $R^2$: hydrocarbon group;
M: any one atom of Si, Mg, Al, Zr, and Ti;
m: zero or a positive integer;
n: a positive integer; and
m+n: a valence of the atom M.

According to a sixth preferred aspect of the present invention, the hyperbranched polyimide-based material is a polymer blend of the organic-inorganic polymer hybrid and a straight-chain hydroxypolyimide.

As described above, the gas separation membrane of the present invention is obtained by heat treating the membrane composed of the hyperbranched polyimide-based material in the non-oxidizing atmosphere. Accordingly, as a result of the hyperbranched structure, free-volume holes having a size effective for $CO_2/CH_4$ separation are formed, thereby resulting in excellent $CO_2$ permeability and $CO_2/CH_4$ separation characteristics. In particular, the gas separation membranes obtained by heat treating each of the above-described specific membranes in the non-oxidizing atmosphere, i.e., the membrane composed of the hyperbranched polyimide, the membrane composed of the polymer blend of the hyperbranched polyimide and the straight-chain hydroxypolyimide, the membrane composed of the organic-inorganic polymer hybrid, and the membrane composed of the polymer blend of the organic-inorganic polymer hybrid and the straight-chain hydroxypolyimide, as the membranes composed of the hyperbranched polyimide-based materials, are further excellent in $CO_2$ permeability and $CO_2/CH_4$ separation characteristics.

DETAILED DESCRIPTION OF THE INVENTION

In the production of the gas separation membrane of the present invention, a membrane composed of a hyperbranched polyimide-based material is first produced as a precursor of such a gas separation membrane. Here, the hyperbranched polyimide-based material in this description and the claims includes not only a hyperbranched polyimide having an imide structure produced by a reaction of an aromatic tetracarboxylic dianhydride and an aromatic triamine, but also a mixture (polymer blend) of such a hyperbranched polyimide and another resin, and an organic-inorganic polymer hybrid having a composite structure in which a hyperbranched polyimide moiety and an inorganic oxide moiety are integrated by a covalent bond.

In the present invention, as the membranes composed of the hyperbranched polyimide-based materials, there are advantageously used, particularly, (A) a membrane composed of a hyperbranched polyimide (hereinafter also referred to as a hyperbranched PI membrane), (B) a membrane composed of a polymer blend of a hyperbranched polyimide and a straight-chain hydroxypolyimide (hereinafter also referred to as a hyperbranched PI—straight-chain PI membrane), (C) a membrane composed of an organic-inorganic polymer hybrid (hereinafter also referred to as a HBD membrane), and (D) a membrane composed of a polymer blend of an organic-inorganic polymer hybrid and a straight-chain hydroxypolyimide (hereinafter also referred to as a HBD—straight-chain PI membrane). Hereinafter, the membranes composed of these hyperbranched polyimide-based materials will be described in detail.

(A) Membrane Composed of Hyperbranched Polyimide (Hyperbranched PI Membrane)

Figure 1:
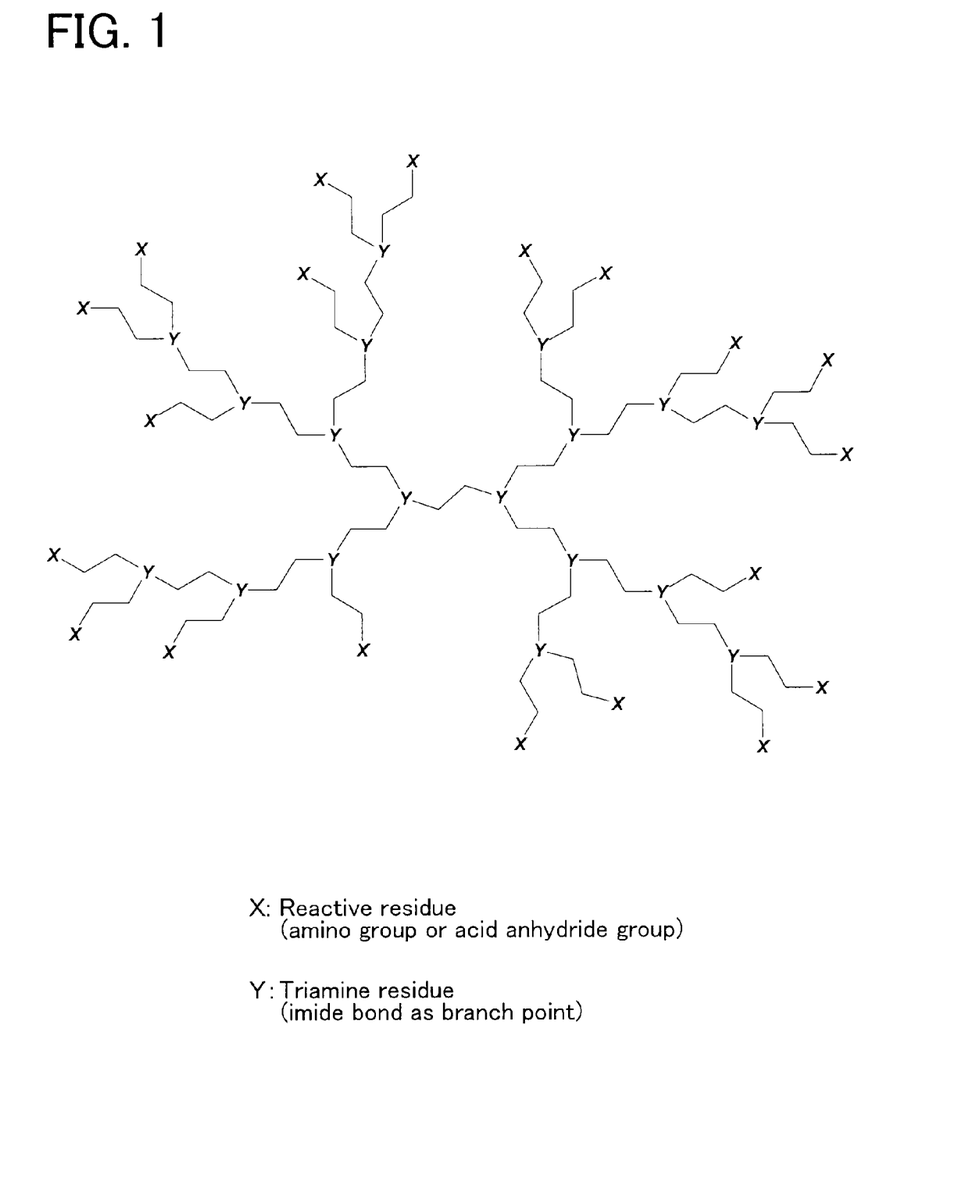
FIG. 1 is an illustration schematically showing a structure of a hyperbranched polyimide constituting a precursor of a gas separation membrane of the present invention.

The hyperbranched polyimide in the present invention shows, for example, a structure as shown in FIG. 1. The hyperbranched polyimide can be synthesized by at least reacting an aromatic tetracarboxylic dianhydride and an aromatic triamine in accordance with a conventionally known procedure to obtain a hyperbranched polyamic acid, and imidizing such a hyperbranched polyamic acid. The hyperbranched polyimide having such a structure can be produced, for example, in accordance with the following procedure.

First, the aromatic tetracarboxylic dianhydride and the aromatic triamine are reacted to synthesize the hyperbranched polyamic acid.

Here, in the present invention, any conventionally known aromatic tetracarboxylic dianhydride and aromatic triamine can be used. From these known ones, one or more kinds are appropriately selected and used depending on a desired gas separation membrane.

Specifically, examples of the aromatic tetracarboxylic dianhydrides include compounds such as pyromellitic dianhydride (PMDA), oxydiphthalic dianhydride (ODPA), 3,3',4,4'-benzophenone tetracarboxylic dianhydride (BTDA), 3,3',4,4'-diphenylsulfone tetracarboxylic dianhydride (DSDA), 4,4'-(hexafluoroisoproylidene)diphthalic dianhydride (6FDA), 2,2'-bis[(dicarboxyphenoxy)phenyl]propane dianhydride (BSAA) and 3,3',4,4'-biphenyltetracarboxylic dianhydride (BPDA).

Further, examples of the aromatic triamines include aromatic compounds each including three amino groups in a molecule thereof, such as, 1,3,5-triamino benzene, tris(3-aminophenyl)amine, tris(4-aminophenyl)amine, tris(3-aminophenyl)benzene, tris(4-aminophenyl)benzene, 1,3,5-tris(3-aminophenoxy)benzene, 1,3,5-tris(4-aminophenoxy)benzene, 1,3,5-tris(4-aminophenoxy)triazine, 3,3',5-triaminodiphenyl ether, and 2,4,4'-triaminodiphenyl ether.

In the present invention, together with the above-mentioned aromatic triamine, an aromatic diamine, a siloxane diamine, or an aromatic compound including four or more amino groups within a molecule thereof may be used in a state copolymerized with the aromatic triamine, or in a manner to add the aromatic diamine, the siloxane diamine, or the aromatic compound including four or more amino groups within a molecule thereof simultaneously with the aromatic triamine and the like at the time of synthesis of the polyamic acid. Examples of such an aromatic diamine include phenylene diamine, diamino diphenylmethane, diamino diphenylether, diamino diphenyl, diamino benzophenone, 2,2-bis[(4-aminophenoxy)phenyl]propane, bis[4-aminophenoxyphenyl]sulfone, 2,2-bis[(4-aminophenoxy)phenyl]hexafluoropropane, bis(4-aminophenoxy)benzene, 4,4'-[phenylenebis(1-methylethylidene)]bisaniline, 2,2-bis(4-aminophenyl)hexafluoropropane, and 9,9-bis(aminophenyl)fluorine. Further, examples of the siloxane diamines include (3-aminopropyl)tetramethyl disiloxane, bis(aminophenoxy)dimethylsilane, and bis(3-aminopropyl)polymethyl disiloxane. Furthermore, examples of the aromatic compounds including four or more amino groups within a molecule thereof include tris(3,5-diaminophenyl)benzene, and tris(3,5-diaminophenoxy)benzene.

Further, in the present invention, it is also possible to use a derivative having a substituent such as a hydrocarbon group (an alkyl group, a phenyl group, a cyclohexyl group, or the like), a halogen group, an alkoxy group, an acetyl group, or a sulfonic group on a benzene ring in each of the above-mentioned aromatic tetracarboxylic dianhydride, aromatic triamine, aromatic diamine, and aromatic compound having four or more amino groups in a molecule thereof.

The reaction of such an aromatic tetracarboxylic dianhydride and the aromatic triamine (and the aromatic diamine, the siloxane diamine or the aromatic compound having four or more amino groups in a molecule thereof, which are each hereinafter appropriately referred to as an amine component) is preferably conducted at a relatively low temperature, specifically at a temperature of 100° C. or lower and preferably 50° C. or lower. Further, the aromatic tetracarboxylic dianhydride and the amine component are preferably reacted with each other at such a quantitative ratio that the reaction mole ratio ([aromatic tetracarboxylic dianhydride]:[amine component]) ranges from 1.0:0.3 to 1.0:1.2, preferably 1.0:0.4 to 1.0:1.1.

Furthermore, in the production of the membrane composed of the hyperbranched polyimide (hyperbranched PI membrane), it is preferable that the respective components are reacted in a predetermined solvent. Examples of the solvents which can be used in the present invention include aprotic polar solvents such as N-methyl-2-pyrrolidone, N,N-dimethylacetamide, dimethyl formamide, dimethyl sulfoxide, tetramethyl sulfone, hexamethyl sulfone, and hexamethyl phosphoamide, phenolic solvents such as m-cresol, o-cresol, m-chlorophenol, and o-chlorophenol, ether-based solvents such as dioxane, tetrahydrofuran, and diglyme. Any one of, or any combination of these solvents may be used.

Next, the obtained hyperbranched polyamic acid is reacted with an alkoxy compound of silicon, magnesium, aluminum, zirconium, or titanium, which has an amino group or a carboxyl group at an end thereof (hereinafter also simply referred to as an alkoxy compound), or a derivative thereof.

That is to say, at least one of acid anhydride groups or amino groups present at ends of the hyperbranched polyamic acid and an amino group or a carboxyl group in the alkoxy compound react with each other, thereby obtaining a hyperbranched polyamic acid having an alkoxy group at least one of a plurality of ends thereof. In the case where water is present in a reaction system, a part of the alkoxy groups is hydrolyzed by such water to form hydroxyl groups.

Here, it is possible in the present invention to use any one of conventionally known alkoxy compounds of silicon, magnesium, aluminum, zirconium, or titanium, which have an amino group or a carboxyl group at an end thereof. Further, the alkoxy compound of silicon, magnesium, aluminum, zirconium, or titanium, which has a carboxyl group at an end thereof, is a carboxylic acid or an acid anhydride, which has at an end thereof a functional group represented by general formula: —COOH or general formula: —CO—O—CO—, and an acid halide (general formula: —COX, wherein X is any atom of F, Cl, Br and I) which is a derivative thereof can also be used in the present invention.

Examples of the alkoxy compounds of silicon include 3-aminopropyltrimethoxysilane, 3-aminopropyltriethoxysilane, aminophenyltrimethoxysilane, 3-aminopropylmethyldiethoxysilane, aminophenyldimethylmethoxysilane, (aminoethylaminomethyl)phenethyl trimethoxysilane, propyltrimethoxysilyl carboxylic acid, propylmethyldiethoxysilyl carboxylic acid, dimethylmethoxysilyl benzoic acid, and further, 3-triethoxysilylpropyl succinic anhydride as an acid anhydride can also be used. Examples of the alkoxy compounds of titanium include those having structures (the following structural formula) as shown in paragraph [0085] of JP-A-2004-114360. Further, examples of the derivatives of the alkoxy compounds include various halogenides.

[Chemical Formula 1]

The reaction of the above-mentioned alkoxy compound and the hyperbranched polyamic acid is desirably conducted under the same temperature conditions as in the previously described reaction between the aromatic tetracarboxylic dianhydride and the amine component.

Then, when a membrane forming treatment (such as a heat treatment or a chemical treatment) is performed to the hyperbranched polyamic acid thus synthesized, reactive residues (amino groups or acid anhydride groups) which have been present in a molecule of the polyamic acid from the time of synthesis are imidized (cyclodehydrated), thereby obtaining the membrane of the hyperbranched polyimide.

Here, any conventionally known procedure for forming a membrane can be employed. Specifically, the following four procedures can be exemplified, for example: 1) a method in which a reaction solution containing the above-mentioned hyperbranched polyamic acid having an alkoxy group (or a hydroxyl group) at least one of a plurality of ends thereof is cast onto a substrate such as a glass or a polymer film, followed by heat treatment (heat drying); 2) a method in which the solution is cast onto a substrate such as a glass or a polymer film, and then, immersed in a receipt solvent such as water, alcohol or hexane to form a film, followed by heat treatment (heat drying); 3) a method in which a heat treatment or the like to the reaction solution is performed in advance to imidize (cyclodehydrate) the hyperbranched polyamic acid contained therein, and then, a membrane is formed from such a solution by a cast method, followed by drying; and 4) a method in which the solution having the imidized hyperbranched polyamic acid as in the above 3) is cast onto a substrate, and then, immersed in a receipt solvent of a polymer in the same manner as in the above 2) to form a film, followed by heat treatment (heat drying).

The hyperbranched polyimide membrane obtained as above can exhibit various functions by chemically modifying the reactive residues (amino groups or acid anhydride groups) present at ends of the hyperbranched polyimide with various compounds to give functional groups.

(B) Membrane Composed of Polymer Blend of Hyperbranched Polyimide and Straight-Chain Hydroxypolyimide (Hyperbranched PI—Straight-Chain PI Membrane)

The straight-chain hydroxypolyimide constituting the polymer blend used in the present invention is, for example, represented by the following structural formula. The straight-chain hydroxypolyimide represented by the following structural formula can be obtained by reacting 4,4'-(hexafluoroisoproylidene)diphthalic dianhydride (6FDA) and 3,3'-dihydroxybenzidine (HAB) to form a straight-chain hydroxypolyamic acid, and imidizing such a straight-chain hydroxypolyamic acid.

[Chemical Formula 2]

where n is a positive integer.

In the production of the hyperbranched PI—straight-chain PI membrane, a hyperbranched polyamic acid and a straight-chain hydroxypolyamic acid are each prepared. Here, the hyperbranched polyamic acid having a hydroxyl group or an alkoxy group at least one of a plurality of ends thereof can be prepared by the procedure described in the paragraph of (A) Membrane Composed of Hyperbranched Polyimide (Hyperbranched PI Membrane).

The straight-chain hydroxypolyamic acid is synthesized by reacting an aromatic tetracarboxylic dianhydride and an aromatic hydroxydiamine. Any conventionally known aromatic tetracarboxylic dianhydride and the aromatic hydroxydiamine may be used in the present invention. From these known ones, one or more kinds are appropriately selected and used depending on the desired gas separation membrane.

Specifically, examples of aromatic tetracarboxylic dianhydrides include compounds such as pyromellitic dianhydride (PMDA), oxydiphthalic dianhydride (ODPA), 3,3',4,4'-benzophenonetetracarboxylic dianhydride (BTDA), 3,3',4,4'-diphenylsulfone tetracarboxylic dianhydride (DSDA), 4,4'-(hexafluoroisoproylidene)diphthalic dianhydride (6FDA), 2,2'-bis[(dicarboxyphenoxy)phenyl]propane dianhydride (BSAA) and 3,3',4,4'-biphenyltetracarboxylic dianhydride (BPDA).

Further, examples of the aromatic hydroxydiamines include compounds such as 3,3'-dihydroxybenzidine, 3,4'-diamino-3',4-dihydroxybiphenyl, 3,3'-dihydroxy-4,4'-diaminodiphenyl oxide, 3,3'-dihydroxy-4,4'-diaminodiphenylsulfone, 2,2-bis(3-amino-4-hydroxyphenyl)propane, bis(3-hydroxy-4-aminophenyl)methane, 2,4-diaminophenol, 3,3'-dihydroxy-4,4'-diaminobenzophenone, 1,1-bis(3-hydroxy-4-aminophenyl)ethane, 1,3-bis(3-hydroxy-4-aminophenyl)propane, 2,2-bis(3-hydroxy-4-aminophenyl)propane and 2,2-bis(3-amino-4-hydroxyphenyl)hexafluoropropane. In the present invention, particularly, 3,3'-dihydroxybenzidine is advantageously used.

In the preparation of the straight-chain hydroxypolyamic acid using the above-mentioned respective components, it is preferable that the preparation be conducted in a predetermined solvent. Examples of the solvents which can be used in the present invention include aprotic polar solvents such as N-methyl-2-pyrrolidone, N,N-dimethylacetamide, dimethyl formamide, dimethyl sulfoxide, tetramethyl sulfone, hexamethyl sulfone and hexamethyl phosphoamide, phenolic solvents such as m-cresol, o-cresol, m-chlorophenol, and o-chlorophenol, ether-based solvents such as dioxane, tetrahydrofuran, and diglyme. Any one of, or any combination of these solvents may be used. Further, in the preparation of the straight-chain hydroxypolyamic acid using such a solvent, any one of conventionally known procedures can be employed.

In the production of the hyperbranched PI—straight-chain PI membrane, which is the precursor of the gas separation membrane of the present invention, using the straight-chain hydroxypolyamic acid and the hyperbranched polyamic acid (or the hyperbranched polyamic acid having a hydroxyl group or an alkoxy group at least one of a plurality of ends thereof, which is also hereinafter collectively referred to as the hyperbranched polyamic acid in this paragraph), there can be exemplified a procedure in which the straight-chain hydroxypolyamic acid and the hyperbranched polyamic acid are mixed in a predetermined solvent, and membrane is formed using this mixed solution in accordance with a conventionally known method for forming membrane. Such a mixed solution is prepared so that the compounding ratio of the straight-chain hydroxypolyamic acid and the hyperbranched polyamic acid satisfies [straight-chain hydroxypolyamic acid]:[hyperbranched polyamic acid]=5:95 to 95:5 (weight ratio), preferably 20:80 to 80:20 (weight ratio). The same method described in the paragraph of (A) Membrane Composed of Hyperbranched Polyimide (Hyperbranched PI Membrane) can be employed as the membrane forming method.

(C) Membrane Composed of Organic-Inorganic Polymer Hybrid (HBD Membrane)

Figure 2:
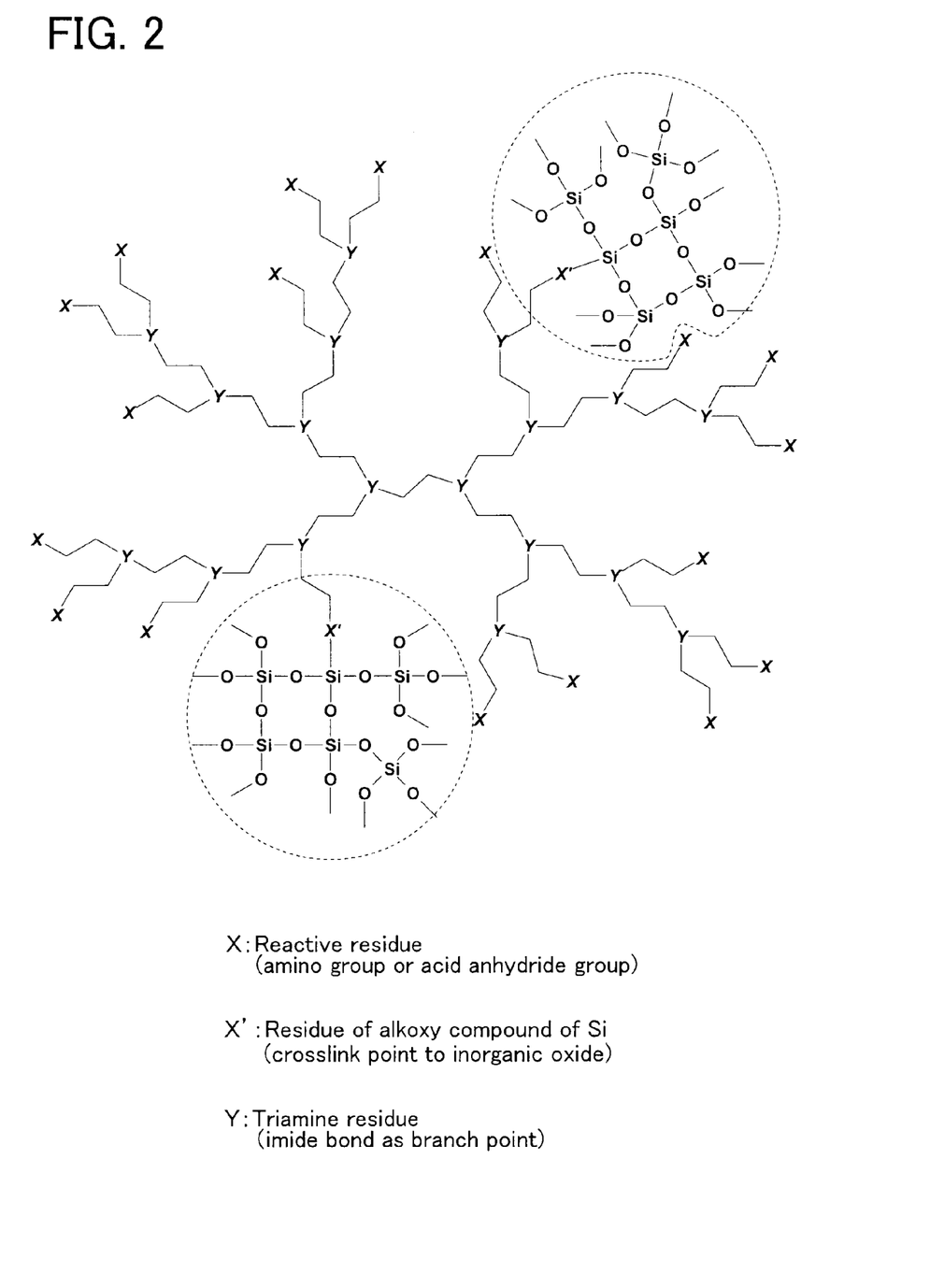
FIG. 2 is an illustration schematically showing a structure of an organic-inorganic polymer hybrid (hyperbranched polyimide-silica hybrid) constituting a precursor of a gas separation membrane of the present invention.

The organic-inorganic polymer hybrid in the present invention shows, for example, a structure as shown in FIG. 2. That is to say, as shown in FIG. 2, a hyperbranched polyimide moiety that has an imide structure produced by a reaction of an aromatic tetracarboxylic dianhydride and an aromatic triamine and an inorganic oxide moiety (a portion surrounded by a dotted line in FIG. 2) that is composed of an inorganic polymer constituted by $SiO_2$ units are integrated by a covalent bond to have a composite structure. The organic-inorganic polymer hybrid having such a structure can be produced, for example, by the following procedure. Further, examples of the aromatic tetracarboxylic dianhydride and the aromatic triamine which can be used in such a reaction are the same as compounds enumerated in the paragraph of (A) Membrane Composed of Hyperbranched Polyimide (Hyperbranched PI Membrane). Further, the membrane forming method described in the paragraph of (A) Membrane Composed of Hyperbranched Polyimide (Hyperbranched PI Membrane) can be advantageously employed.

In the production of the HBD membrane, a hyperbranched polyamic acid having a hydroxyl group or an alkoxy group at least one of a plurality of ends thereof is prepared. Here, the hyperbranched polyamic acid can be prepared by the procedure described in the paragraph of (A) Membrane Composed of Hyperbranched Polyimide (Hyperbranched PI Membrane).

Then, the desired organic-inorganic polymer hybrid is obtained from the thus-prepared hyperbranched polyamic acid having an alkoxy group (or a hydroxyl group) at least one of a plurality of ends thereof and at least one kind of predetermined alkoxides.

Specifically, when the hyperbranched polyamic acid having an alkoxy group (or a hydroxyl group) at least one of a plurality of ends thereof and at least one kind of predetermined alkoxides are allowed to be present in the same system in the presence of water, the alkoxy group in a hyperbranched polyamic acid molecule and the alkoxide are condensation polymerized by a sol-gel reaction, thereby forming an inorganic oxide moiety (an inorganic polymer constituted by $SiO_2$ units in FIG. 2) as shown in FIG. 2.

Then, when the membrane forming treatment (the heat treatment or the chemical treatment) is performed to the hyperbranched polyamic acid in which the inorganic oxide moiety is formed in this manner, reactive residues (amino groups or acid anhydride groups) which have been present in the polyamic acid molecule from the time of synthesis thereof are imidized (cyclodehydrated), thereby obtaining a membrane of the organic-inorganic polymer hybrid having the composite structure in which the hyperbranched polyimide moiety and the inorganic oxide moiety are integrated by the covalent bond.

In the production of the membrane composed of the organic-inorganic polymer hybrid (HBD membrane) in the present invention, it is of course possible to conduct cyclodehydration of the hyperbranched polyamic acid, before the condensation polymerization between the hyperbranched polyamic acid and the alkoxide by the sol-gel reaction. Further, it is also possible to continuously conduct the condensation polymerization (the sol-gel reaction) of the hyperbranched polyamic acid and the alkoxide and the cyclodehydration of the hyperbranched polyamic acid. Specifically, it is also possible to cyclodehydrate the hyperbranched polyamic acid (condensation polymerized with the alkoxide) in the solution by adding the alkoxide into a solution of the hyperbranched polyamic acid, followed by stirring at a relatively low temperature for a predetermined period of time to condensation polymerize the hyperbranched polyamic acid and the alkoxide, and thereafter heating such a solution. Further, it is preferable that the sol-gel reaction between the hyperbranched polyamic acid and the alkoxide be proceed at a temperature of 100° C. or lower, and advantageously 50° C. or lower.

Here, as the alkoxide which is reacted with the hyperbranched polyamic acid, there is used one which can be condensation polymerized between molecules in the presence of water, and is represented by the following formula (1). Specific examples thereof include compounds such as dimethoxy magnesium, diethoxy magnesium, trimethoxy aluminum, triethoxy aluminum, triisopropoxy aluminum, tetramethoxy silane, methyltrimethoxysilane, tetraethoxy silane, tetramethoxy titanium, tetraethoxy titanium, tetraisopropoxy titanium, tetramethoxy zirconium, tetraethoxy zirconium, and alkyl substitution products of these compounds. One or more kinds of such compounds is/are appropriately selected and used.

formula (1)

where
$R^1$, $R^2$: hydrocarbon group
M: any one atom of Si, Mg, Al, Zr and Ti
m: zero or a positive integer
n: a positive integer
m+n: a valence of atom M.

Further, an increase or decrease in the addition amount of the alkoxide results in an increase or a decrease in the amount of the inorganic oxide in the organic-inorganic polymer hybrid membrane (the precursor of the gas separation membrane of the present invention). Generally, the amount of the inorganic oxide in such a hybrid material is desirably within a range of 0.05 to 95% by weight, and preferably within a range of 0.1 to 50% by weight. As the amount of the inorganic oxide contained increases, the hyperbranched polyimide-based hybrid material is improved in heat resistance, elastic modulus, hardness, and the like. On the other hand, the material itself becomes brittle, which may result in the formation of cracks and deterioration of impact resistance. Accordingly, the addition amount of the alkoxide is determined so that the amount of the inorganic oxide is within an appropriate range.

Further, the organic-inorganic polymer hybrid membrane obtained as described above can exhibit various functions by chemically modifying the reactive residues (amino groups or acid anhydride groups) present at ends of the hyperbranched polyimide with various compounds to give functional groups.

(D) Membrane Composed of Polymer Blend of Organic-Inorganic Polymer Hybrid and Straight-Chain Hydroxypolyimide (HBD—Straight-Chain PI Membrane)

A hyperbranched polyamic acid having a hydroxyl group or an alkoxy group at at least one of a plurality of ends thereof and a straight-chain hydroxypolyamic acid, which constitute the polymer blend used in the present invention, can be prepared by the procedure described in the paragraph of (B) Membrane Composed of Polymer Blend of Hyperbranched Polyimide and Straight-Chain Hydroxypolyimide (Hyperbranched PI—Straight-Chain PI Membrane). Further, the mixed solution of the hyperbranched polyamic acid and the straight-chain hydroxypolyamic acid can also be prepared by the procedure described in the paragraph of (B) Membrane Composed of Polymer Blend of Hyperbranched Polyimide and Straight-Chain Hydroxypolyimide (Hyperbranched PI—Straight-Chain PI Membrane). Further, the method described in the paragraph of (A) Membrane Composed of Hyperbranched Polyimide (Hyperbranched PI Membrane) can be employed as the membrane forming method.

When the HBD—straight-chain PI membrane is produced, a hyperbranched polyamic acid having an alkoxy group (or a hydroxyl group) at least one of a plurality of ends thereof is used, and a reaction of such a hyperbranched polyamic acid with a predetermined alkoxide described below is conducted at least before the membrane forming treatment is performed. That is to say, when the hyperbranched polyamic acid having an alkoxy group (or a hydroxyl group) at least one of a plurality of ends thereof and at least one kind of predetermined alkoxides are allowed to be present in the same system in the presence of water, the alkoxy groups in a hyperbranched polyamic acid molecule and the alkoxide are condensation polymerized by a sol-gel reaction to advantageously form an inorganic oxide moiety composed of an inorganic polymer constituted by silicon oxide units or the like, whereby a gas separation membrane finally obtained becomes further excellent in gas permeability and gas permselectivity.

In the present invention, it is of course possible to conduct imidization of the hyperbranched polyamic acid, before conducting the condensation polymerization between the hyperbranched polyamic acid having an alkoxy group (or a hydroxyl group) at least one of a plurality of ends thereof and the alkoxide by the sol-gel reaction. Further, it is also possible to continuously conduct the condensation polymerization (the sol-gel reaction) of the above-mentioned hyperbranched polyamic acid and the alkoxide, and the imidization of the hyperbranched polyamic acid. Specifically, it is also possible to add the alkoxide into a solution of the hyperbranched polyamic acid, followed by stirring in a state kept at a relatively low temperature for a predetermined period of time to condensation polymerize the hyperbranched polyamic acid and the alkoxide, and then heat such a solution, thereby imidizing (cyclodehydrating) the hyperbranched polyamic acid (condensation polymerized with the alkoxide) in the solution.

Further, it is preferable that the sol-gel reaction between the hyperbranched polyamic acid and the alkoxide be proceed at a temperature of 100° C. or lower, and advantageously 50° C. or lower.

Here, as the alkoxide which is reacted with the hyperbranched polyamic acid having an alkoxy group (or a hydroxyl group) at least one of a plurality of ends thereof, there is used one which can be condensation polymerized between molecules in the presence of water and is represented by the following formula (1). Specific examples thereof include compounds such as dimethoxy magnesium, diethoxy magnesium, trimethoxy aluminum, triethoxy aluminum, triisopropoxy aluminum, tetramethoxy silane, methyltrimethoxy silane, tetraethoxy silane, tetramethoxy titanium, tetraethoxy titanium, tetraisopropoxy titanium, tetramethoxy zirconium, tetraethoxy zirconium, and alkyl substitution products of these compounds. One or more kinds of such compounds is/are appropriately selected and used.

formula (1)

where
R$^1$, R$^2$: hydrocarbon group
M: any one atom of Si, Mg, Al, Zr and Ti
m: zero or a positive integer
n: a positive integer
m+n: a valence of atom M.

Further, an increase or decrease in the addition amount of such an alkoxide results in an increase or decrease in the amount of the inorganic oxide in the gas separation membrane finally obtained. Generally, the amount of the inorganic oxide in such a gas separation membrane is desirably within a range of 0.05 to 95% by weight, and preferably within a range of 0.1 to 50% by weight. As the amount of the inorganic oxide contained increases, the gas separation membrane is improved in heat resistance, elastic modulus, hardness, and the like. On the other hand, the material itself becomes brittle, which may result in the formation of cracks and deterioration of impact resistance. Accordingly, the addition amount of the alkoxide is determined so that the amount of the inorganic oxide is within an appropriate range.

Then, the membrane composed of the hyperbranched polyimide-based material prepared as described above (the hyperbranched PI membrane, the hyperbranched PI—straight-chain PI membrane, the HBD membrane, or the HBD—straight-chain PI membrane) is heat treated in a non-oxidizing atmosphere, thereby obtaining the gas separation membrane of the present invention.

Various conditions of such a heat treatment, for example, the heating temperature, the heating time, and the like, are appropriately determined depending on the kind of hyperbranched polyimide-based material constituting the membrane as the precursor, characteristics of the desired gas separation membrane, or the like. However, such conditions that the membrane composed of the hyperbranched polyimide-based material is not completely carbonized, that is to say, such conditions as to be partially carbonized (partial carbonization) is advantageously employed. Specifically, the heating temperature is set to a temperature exceeding a temperature at which the membrane is heat imidized, but lower than a temperature at which most thereof is carbonized, preferably a temperature of 300 to 500° C. Further, the heating time is from 30 minutes to 2 hours depending on the heating temperature.

Further, in the present invention, the heat treatment of the membrane composed of the hyperbranched polyimide-based material is performed in the non-oxidizing atmosphere. The heat treatment is performed, for example, in an inert gas atmosphere or under reduced pressure (vacuum).

Then, the gas separation membrane thus obtained has both excellent gas permeability and gas separation characteristics, particularly permeability of carbon dioxide ($CO_2$) and separation characteristics of carbon dioxide and methane ($CH_4$), at such a high level that has not hitherto been achieved.

EXAMPLES

To further clarify the concept of the present invention, some examples of the invention will be described. It is to be understood that the invention is not limited to the details of illustrated examples and foregoing description, but may be embodied with various changes, modifications, and improvements, which may occur to those skilled in the art without departing from the scope of the invention.

Example 1

A three-necked flask of 100 mL that is provided with a stirrer, a nitrogen introducing tube, and a calcium chloride tube was charged with 1.33 g (3 mmol) of 4,4'-(hexafluoroisoproylidene)diphthalic dianhydride (6FDA), and 40 mL of dimethyl acetamide (DMAc) was added and dissolved therein. While stirring this solution, 0.64 g (1.6 mmol) of 1,3,5-tris(4-aminophenoxy)benzene (TAPOB) dissolved in 20 mL of DMAc was gradually added thereto, followed by stirring at 25° C. for 3 hours to synthesize an anhydride-terminated hyperbranched polyamic acid.

To the DMAc solution of the resulting anhydride-terminated hyperbranched polyamic acid, 0.072 g (0.4 mmol) of 3-aminopropyltrimethoxysilane (APTrMOS) was added, followed by further stirring for two hours and a half, thereby synthesizing an anhydride-terminated hyperbranched polyamic acid in which at least one of a plurality of molecular ends thereof were modified with APTrMOS (hereinafter referred to as a silane-modified anhydride-terminated hyperbranched polyamic acid). The DMAc solution of this silane-modified anhydride-terminated hyperbranched polyamic acid was cast onto a polyester film, and dried at 85° C. for 2 hours, followed by further heat treatment in a nitrogen atmosphere at 100° C. for 1 hour, at 200° C. for 1 hour, and at 300° C. for 1 hour, thereby obtaining a membranous sample. Then, such a membranous sample was further heat treated in a nitrogen atmosphere at 450° C. for 1 hour, thereby obtaining a gas separation membrane (sample 1).

The resulting gas separation membrane (sample 1) was transparent and dark brown. Further, the thermogravimetric measurement (TGA measurement) was carried out at a rate of temperature increase of 10° C./min. As a result, the thermal decomposition temperature (5% weight loss temperature: $T_d^5$) was 509° C. Furthermore, the gas permeation measurement of sample 1 was carried out under the condition of 1 atm and 25° C. in accordance with a constant-volume method (JIS standard test method: JIS-Z-1707). The measurement results thereof are shown in the following Table 1.

Example 2

To 6.0 g of the DMAc solution of the silane-modified anhydride-terminated hyperbranched polyamic acid obtained in the same procedure as in Example 1, 0.063 g of tetramethoxysilane (TMOS) and 0.045 g of water ($H_2O$) were added, followed by stirring at room temperature for 24 hours. Thereafter, this mixed solution was cast onto a polyester film, and dried at 85° C. for 2 hours, followed by further heat treatment in a nitrogen atmosphere at 100° C. for 1 hour, at 200° C. for 1 hour, and at 300° C. for 1 hour, thereby obtaining a membranous sample. Then, such a membranous sample was further heat treated in a nitrogen atmosphere at 450° C. for 1 hour, thereby obtaining a gas separation membrane (sample 2). In such a gas separation membrane (sample 2), the silica amount (in terms of silicon dioxide) was 10% by weight.

The resulting gas separation membrane (sample 2) was transparent and dark brown. Further, the thermogravimetric measurement (TGA measurement) was carried out under the same condition as in Example 1. As a result, the thermal decomposition temperature (5% weight loss temperature: $T_d^5$) was 511° C. Furthermore, the gas permeation measurement of sample 2 was carried out under the same condition as in Example 1. The measurement results thereof are shown in the following Table 1.

Example 3

To 6.0 g of the DMAc solution of the silane-modified anhydride-terminated hyperbranched polyamic acid obtained in the same procedure as in Example 1, 0.127 g of methyltrimethoxysilane (MTMS) and 0.076 g of water ($H_2O$) were added, followed by stirring at room temperature for 24 hours. Thereafter, this mixed solution was cast onto a polyester film, and dried at 85° C. for 2 hours, followed by further heat treatment in a nitrogen atmosphere at 100° C. for 1 hour, at 200° C. for 1 hour, and at 300° C. for 1 hour, thereby obtaining a membranous sample. Then, such a membranous sample was further heat treated in a nitrogen atmosphere at 450° C. for 1 hour, thereby obtaining a gas separation membrane (sample 3). In such a gas separation membrane (sample 3), the silica amount (in terms of silicon dioxide) was 20% by weight.

The resulting gas separation membrane (sample 3) was transparent and dark brown. Further, the thermogravimetric measurement (TGA measurement) was carried out under the same condition as in Example 1. As a result, the thermal decomposition temperature (5% weight loss temperature: $T_d^5$) was 514° C. Furthermore, the gas permeation measurement of sample 3 was carried out under the same condition as in Example 1. The measurement results thereof are shown in the following Table 1.

Example 4

To 6.0 g of the DMAc solution of the silane-modified anhydride-terminated hyperbranched polyamic acid obtained in the same procedure as in Example 1, 0.183 g (0.8 mmol) of 3,5-bis(trifluoromethyl)aniline (6FMA) was added, followed by stirring at room temperature for 2 hours. Thereafter, this mixed solution was cast onto a polyester film, and dried at 85° C. for 2 hours, followed by further heat treatment in a nitrogen atmosphere at 100° C. for 1 hour, at 200° C. for 1 hour, and at 300° C. for 1 hour, thereby obtaining a membranous sample. Then, such a membranous sample was further heat treated in a nitrogen atmosphere at 450° C. for 1 hour, thereby obtaining a gas separation membrane (sample 4).

The resulting gas separation membrane (sample 4) was transparent and dark brown. Further, the thermogravimetric measurement (TGA measurement) was carried out under the same condition as in Example 1. As a result, the thermal decomposition temperature (5% weight loss temperature: $T_d^5$) was 510° C. Furthermore, the gas permeation measurement of sample 4 was carried out under the same condition as in Example 1. The measurement results thereof are shown in the following Table 1.

Example 5

A three-necked flask of 300 mL that is provided with a stirrer, a nitrogen introducing tube, and a calcium chloride tube was charged with 7.2 g (18 mmol) of TAPOB, and 30 mL of DMAc was added and dissolved therein. While stirring this solution, 6.4 g (14.4 mmol) of 6FDA dissolved in 54 mL of DMAc was gradually added thereto, followed by stirring at 25° C. for 3 hours to synthesize an amine-terminated hyperbranched polyamic acid.

To the DMAc solution of the resulting amine-terminated hyperbranched polyamic acid, 0.86 g (2.8 mmol) of 3-triethoxysilylpropyl succinic anhydride (TEOSPSA) was added, followed by further stirring for 2 hours, thereby obtaining an amine-terminated hyperbranched polyamic acid in which at least one of a plurality of ends was modified with TEOSPSA (hereinafter referred to as a silane-modified amine-terminated hyperbranched polyamic acid).

Meanwhile, another three-necked flask of 300 mL that is provided with a stirrer, a nitrogen introducing tube, and a calcium chloride tube was charged with 32.0 g (72 mmol) of 6FDA, and 156 mL of DMAc was added and dissolved therein. While stirring this solution, 15.3 g (71.28 mmol) of 3,3'-dihydroxybenzidine (HAB) was gradually added thereto, followed by stirring at 25° C. for 3 hours to synthesize a straight-chain hydroxypolyamic acid (6FDA-HAB).

The DMAc solution of the silane-modified amine-terminated hyperbranched polyamic acid and the DMAc solution of the straight-chain hydroxypolyamic acid, which were obtained as described above, were mixed at a ratio of the silane-modified amine-terminated hyperbranched polyamic acid: the straight-chain hydroxypolyamic acid=40:60 (polymer weight ratio). The resulting mixed solution was cast onto a polyester sheet, and dried at 85° C. for 2 hours, followed by further heat treatment in a nitrogen atmosphere at 100° C. for 1 hour, at 200° C. for 1 hour, and at 300° C. for 1 hour, thereby obtaining a membranous sample. Then, such a membranous sample was further heat treated in a nitrogen atmosphere at 450° C. for 1 hour, thereby obtaining a gas separation membrane (sample 5).

The resulting gas separation membrane (sample 5) was transparent and dark brown. Further, the thermogravimetric measurement (TGA measurement) was carried out under the same condition as in Example 1. As a result, the thermal decomposition temperature (5% weight loss temperature: $T_d^5$) was 488° C. Furthermore, the gas permeation measurement of sample 5 was carried out under the same condition as in Example 1. The measurement results thereof are shown in the following Table 1.

Example 6

To 4.0 g of the mixed solution of the DMAc solution of the silane-modified amine-terminated hyperbranched polyamic acid and the DMAc solution of the straight-chain hydroxypolyamic acid which were obtained by the same procedure as in Example 5, 0.261 g of TMOS and 0.124 g of $H_2O$ were added, followed by stirring at room temperature for 24 hours. Thereafter, this mixed solution was cast onto a polyester film, and dried at 85° C. for 2 hours, followed by further heat treatment in a nitrogen atmosphere at 100° C. for 1 hour, at 200° C. for 1 hour, and at 300° C. for 1 hour, thereby obtaining a membranous sample. Then, such a membranous sample was further heat treated in a nitrogen atmosphere at 450° C. for 1 hour, thereby obtaining a gas separation membrane (sample 6). In such a gas separation membrane (sample 6), the silica amount (in terms of silicon dioxide) was 10% by weight.

The resulting gas separation membrane (sample 6) was transparent and dark brown. Further, the thermogravimetric measurement (TGA measurement) was carried out under the same condition as in Example 1. As a result, the thermal decomposition temperature (5% weight loss temperature: $T_d^5$) was 495° C. Furthermore, the gas permeation measurement of sample 6 was carried out under the same condition as in Example 1. The measurement results thereof are shown in the following Table 1.

Example 7

The DMAc solution of the silane-modified amine-terminated hyperbranched polyamic acid and the DMAc solution of the straight-chain hydroxypolyamic acid which were obtained by the same procedure as in Example 5 were mixed at a ratio of the silane-modified amine-terminated hyperbranched polyamic acid:the straight-chain hydroxypolyamic acid=20:80 (polymer weight ratio). The resulting mixed solution was cast onto a polyester film, and dried at 85° C. for 2 hours, followed by further heat treatment in a nitrogen atmosphere at 100° C. for 1 hour, at 200° C. for 1 hour, and at 300° C. for 1 hour, thereby obtaining a membranous sample. Then, such a membranous sample was further heat treated in a nitrogen atmosphere at 450° C. for 1 hour, thereby obtaining a gas separation membrane (sample 7).

The resulting gas separation membrane (sample 7) was transparent and dark brown. Further, the thermogravimetric measurement (TGA measurement) was carried out under the same condition as in Example 1. As a result, the thermal decomposition temperature (5% weight loss temperature: $T_d^5$) was 492° C. Furthermore, the gas permeation measurement of sample 7 was carried out under the same condition as in Example 1. The measurement results thereof are shown in the following Table 1.

Example 8

To 4.0 g of the mixed solution of the DMAc solution of the silane-modified amine-terminated hyperbranched polyamic acid and the DMAc solution of the straight-chain hydroxypolyamic acid which were obtained by the same procedure as in Example 7, 0.300 g of TMOS and 0.213 g of $H_2O$ were added, followed by stirring at room temperature for 24 hours. Thereafter, this mixed solution was cast onto a polyester film, and dried at 85° C. for 2 hours, followed by further heat treatment in a nitrogen atmosphere at 100° C. for 1 hour, at 200° C. for 1 hour, and at 300° C. for 1 hour, thereby obtaining a membranous sample. Then, such a membranous sample was further heat treated in a nitrogen atmosphere at 450° C. for 1 hour, thereby obtaining a gas separation membrane (sample 8). In such a gas separation membrane (sample 8), the silica amount (in terms of silicon dioxide) was 10% by weight.

The resulting gas separation membrane (sample 8) was transparent and dark brown. Further, the thermogravimetric measurement (TGA measurement) was carried out under the same condition as in Example 1. As a result, the thermal decomposition temperature (5% weight loss temperature: $T_d^5$) was 494° C. Furthermore, the gas permeation measurement of sample 8 was carried out under the same condition as in Example 1. The measurement results thereof are shown in the following Table 1.

Example 9

The DMAc solution of the silane-modified amine-terminated hyperbranched polyamic acid obtained by the same procedure as in Example 5 was cast onto a polyester film, and dried at 85° C. for 2 hours, followed by further heat treatment in a nitrogen atmosphere at 100° C. for 1 hour, at 200° C. for 1 hour and at 300° C. for 1 hour, thereby obtaining a membranous sample. Then, such a membranous sample was further heat treated in a nitrogen atmosphere at 450° C. for 1 hour, thereby obtaining a gas separation membrane (sample 9).

The resulting gas separation membrane (sample 9) was transparent and dark brown. Further, the thermogravimetric measurement (TGA measurement) was carried out under the same condition as in Example 1. As a result, the thermal decomposition temperature (5% weight loss temperature: $T_d^5$) was 496° C. Furthermore, the gas permeation measurement of sample 9 was carried out under the same condition as in Example 1. The measurement results thereof are shown in the following Table 1.

Comparative Example 1

The DMAc solution of the silane-modified anhydride-terminated hyperbranched polyamic acid obtained by the same procedure as in Example 1 was cast onto a polyester film, and dried at 85° C. for 2 hours, followed by further heat treatment in a nitrogen atmosphere at 100° C. for 1 hour, at 200° C. for 1 hour, and at 300° C. for 1 hour to form a membrane, thereby obtaining a gas separation membrane (sample a).

The resulting gas separation membrane (sample a) was transparent and light yellow. Further, the thermogravimetric measurement (TGA measurement) was carried out under the same condition as in Example 1. As a result, the thermal decomposition temperature (5% weight loss temperature: $T_d^5$) was 457° C. Furthermore, the gas permeation measurement of sample a was carried out under the same condition as in Example 1. The measurement results thereof are shown in the following Table 1.

Comparative Example 2

To 6.0 g of the DMAc solution of the silane-modified anhydride-terminated hyperbranched polyamic acid obtained by the same procedure as in Example 1, 0.063 g of TMOS and 0.045 g of $H_2O$ were added, followed by stirring at room temperature for 24 hours. Thereafter, this mixed solution was cast onto a polyester film, and dried at 85° C. for 2 hours, followed by further heat treatment in a nitrogen atmosphere at 100° C. for 1 hour, at 200° C. for 1 hour, and at 300° C. for 1 hour to form a membrane, thereby obtaining a gas separation membrane (sample b). In such a gas separation membrane (sample b), the silica amount (in terms of silicon dioxide) was 10% by weight.

The resulting gas separation membrane (sample b) was transparent and light yellow. Further, the thermogravimetric measurement (TGA measurement) was carried out under the same condition as in Example 1. As a result, the thermal decomposition temperature (5% weight loss temperature: $T_d^5$) was 490° C. Furthermore, the gas permeation measurement of sample b was carried out under the same condition as in Example 1. The measurement results thereof are shown in the following Table 1.

Comparative Example 3

To 6.0 g of the DMAc solution of the silane-modified anhydride-terminated hyperbranched polyamic acid obtained by the same procedure as in Example 1, 0.127 g of MTMS and 0.076 g of $H_2O$ were added, followed by stirring at room temperature for 24 hours. Thereafter, this mixed solution was cast onto a polyester film, and dried at 85° C. for 2 hours, followed by further heat treatment in a nitrogen atmosphere at 100° C. for 1 hour, at 200° C. for 1 hour and at 300° C. for 1 hour to form a membrane, thereby obtaining a gas separation membrane (sample c). In such a gas separation membrane (sample c), the silica amount (in terms of silicon dioxide) was 20% by weight.

The resulting gas separation membrane (sample c) was transparent and light yellow. Further, the thermogravimetric measurement (TGA measurement) was carried out under the same condition as in Example 1. As a result, the thermal decomposition temperature (5% weight loss temperature: $T_d^5$) was 480° C. Furthermore, the gas permeation measurement of sample c was carried out under the same condition as in Example 1. The measurement results thereof are shown in the following Table 1.

Comparative Example 4

To 0.072 g of the DMAc solution of the silane-modified anhydride-terminated hyperbranched polyamic acid obtained by the same procedure as in Example 1, 0.183 g (0.8 mmol) of 6FMA was added, followed by stirring at room temperature for 2 hours. Thereafter, this mixed solution was cast onto a polyester film, and dried at 85° C. for 2 hours, followed by further heat treatment in a nitrogen atmosphere at 100° C. for 1 hour, at 200° C. for 1 hour, and at 300° C. for 1 hour to form a membrane, thereby obtaining a gas separation membrane (sample d).

The resulting gas separation membrane (sample d) was transparent and light yellow. Further, the thermogravimetric measurement (TGA measurement) was carried out under the same condition as in Example 1. As a result, the thermal decomposition temperature (5% weight loss temperature: $T_d^5$) was 474° C. Furthermore, the gas permeation measurement of sample d was carried out under the same condition as in Example 1. The measurement results thereof are shown in the following Table 1.

Comparative Example 5

The mixed solution of the DMAc solution of the silane-modified amine-terminated hyperbranched polyamic acid and the DMAc solution of the straight-chain hydroxy-polyamic acid which were obtained by the same procedure as in Example 5 was cast onto a polyester film, and dried at 85° C. for 2 hours, followed by further heat treatment in a nitrogen atmosphere at 100° C. for 1 hour, at 200° C. for 1 hour, and at 300° C. for 1 hour to form a membrane, thereby obtaining a gas separation membrane (sample e).

The resulting gas separation membrane (sample e) was transparent and dark reddish-brown. Further, the thermogravimetric measurement (TGA measurement) was carried out under the same condition as in Example 1. As a result, the thermal decomposition temperature (5% weight loss temperature: $T_d^5$) was 478° C. Furthermore, the gas permeation measurement of sample e was carried out under the same condition as in Example 1. The measurement results thereof are shown in the following Table 1.

Comparative Example 6

To 4.0 g of the mixed solution of the DMAc solution of the silane-modified amine-terminated hyperbranched polyamic acid and the DMAc solution of the straight-chain hydroxy-polyamic acid which were obtained by the same procedure as in Example 5, 0.261 g of TMOS and 0.124 g of $H_2O$ were added, followed by stirring at room temperature for 24 hours. Thereafter, this mixed solution was cast onto a polyester film, and dried at 85° C. for 2 hours, followed by further heat treatment in a nitrogen atmosphere at 100° C. for 1 hour, at 200° C. for 1 hour, and at 300° C. for 1 hour to form a membrane, thereby obtaining a gas separation membrane (sample f). In such a gas separation membrane (sample f), the silica amount (in terms of silicon dioxide) was 10% by weight.

The resulting gas separation membrane (sample f) was transparent and dark reddish-brown. Further, the thermogravimetric measurement (TGA measurement) was carried out under the same condition as in Example 1. As a result, the thermal decomposition temperature (5% weight loss temperature: $T_d^5$) was 487° C. Furthermore, the gas permeation measurement of sample f was carried out under the same condition as in Example 1. The measurement results thereof are shown in the following Table 1.

Comparative Example 7

The mixed solution of the DMAc solution of the silane-modified amine-terminated hyperbranched polyamic acid and the DMAc solution of the straight-chain hydroxy-polyamic acid which were obtained by the same procedure as in Example 7 was cast onto a polyester film, and dried at 85° C. for 2 hours, followed by further heat treatment in a nitrogen atmosphere at 100° C. for 1 hour, at 200° C. for 1 hour and at 300° C. for 1 hour to form a membrane, thereby obtaining a gas separation membrane (sample g).

The resulting gas separation membrane (sample g) was transparent and dark reddish-brown. Further, the thermogravimetric measurement (TGA measurement) was carried out under the same condition as in Example 1. As a result, the thermal decomposition temperature (5% weight loss temperature: $T_d^5$) was 479° C. Furthermore, the gas permeation measurement of sample g was carried out under the same condition as in Example 1. The measurement results thereof are shown in the following Table 1.

Comparative Example 8

To 4.0 g of the mixed solution of the DMAc solution of the silane-modified amine-terminated hyperbranched polyamic acid and the DMAc solution of the straight-chain hydroxy-polyamic acid which were obtained by the same procedure as in Example 7, 0.300 g of TMOS and 0.213 g of $H_2O$ were added, followed by stirring at room temperature for 24 hours. Thereafter, this mixed solution was cast onto a polyester film, and dried at 85° C. for 2 hours, followed by further heat treatment in a nitrogen atmosphere at 100° C. for 1 hour, at 200° C. for 1 hour, and at 300° C. for 1 hour to form a membrane, thereby obtaining a gas separation membrane (sample h). Incidentally, in such a gas separation membrane (sample h), the silica amount (in terms of silicon dioxide) was 10% by weight.

The resulting gas separation membrane (sample h) was transparent and dark reddish-brown. Further, the thermogravimetric measurement (TGA measurement) was carried out under the same condition as in Example 1. As a result, the thermal decomposition temperature (5% weight loss temperature: $T_d^5$) was 493° C. Furthermore, the gas permeation measurement of sample h was carried out under the same condition as in Example 1. The measurement results thereof are shown in the following Table 1.

Comparative Example 9

The DMAc solution of the silane-modified amine-terminated hyperbranched polyamic acid obtained by the same procedure as in Example 5 was cast onto a polyester film, and dried at 85° C. for 2 hours, followed by further heat treatment in a nitrogen atmosphere at 100° C. for 1 hour, at 200° C. for 1 hour and at 300° C. for 1 hour to form a membrane, thereby obtaining a gas separation membrane (sample i).

The resulting gas separation membrane (sample i) was transparent and dark reddish-brown. Further, the thermogravimetric measurement (TGA measurement) was carried out under the same condition as in Example 1. As a result, the thermal decomposition temperature (5% weight loss temperature: $T_d^5$) was 491° C. Furthermore, the gas permeation measurement of sample i was carried out under the same condition as in Example 1. The measurement results thereof are shown in the following Table 1.

Comparative Example 10

A three-necked flask of 100 mL that is provided with a stirrer, a nitrogen introducing tube, and a calcium chloride tube was charged with 1.33 g (0.33 mmol) of 6FDA, and 15 mL of DMAc was added and dissolved therein. While stirring this solution, 0.804 g (2.75 mmol) of 1,3-bis(4-aminophenoxy)benzene (TPER) was gradually added thereto, followed by stirring at 25° C. for 3 hours to synthesize a straight-chain polyamic acid.

To the DMAc solution of the resulting straight-chain polyamic acid, 0.089 g (0.5 mmol) of APTrMOS was added, followed by further stirring for 2 hours to obtain a silane-modified anhydride-terminated straight-chain polyamic acid having a structure similar to a silane-modified anhydride-terminated hyperbranched polyamic acid. The DMAc solution of this silane-modified anhydride-terminated straight-chain polyamic acid was cast onto a polyester film, and dried at 85° C. for 2 hours, followed by further heat treatment in a nitrogen atmosphere at 100° C. for 1 hour, at 200° C. for 1 hour and at 300° C. for 1 hour to form a membrane, thereby obtaining a gas separation membrane (sample j).

The resulting gas separation membrane (sample j) was transparent and light yellow. Further, the thermogravimetric measurement (TGA measurement) was carried out under the same condition as in Example 1. As a result, the thermal decomposition temperature (5% weight loss temperature: $T_d^5$) was 490° C. Furthermore, the gas permeation measurement of sample j was carried out under the same condition as in Example 1. The measurement results thereof are shown in the following Table 1.

Comparative Example 11

To 1.5 g of the DMAc solution of the silane-modified anhydride-terminated straight-chain polyamic acid obtained in Comparative Example 10, 0.061 g of TMOS and 0.043 g of H₂O were added, followed by stirring at room temperature for 24 hours. Thereafter, this mixed solution was cast onto a polyester film, and dried at 85° C. for 2 hours, followed by further heat treatment in a nitrogen atmosphere at 100° C. for 1 hour, at 200° C. for 1 hour and at 300° C. for 1 hour to form a membrane, thereby obtaining a gas separation membrane (sample k). In such a gas separation membrane (sample k), the silica amount (in terms of silicon dioxide) was 10% by weight.

The resulting gas separation membrane (sample k) was transparent and light yellow. Further, the thermogravimetric measurement (TGA measurement) was carried out under the same condition as in Example 1. As a result, the thermal decomposition temperature (5% weight loss temperature: $T_d^5$) was 505° C. Furthermore, the gas permeation measurement of sample k was carried out under the same condition as in Example 1. The measurement results thereof are shown in the following Table 1.

Comparative Example 12

The DMAc solution of the silane-modified acid anhydride-terminated straight-chain polyamic acid obtained in Comparative Example 10 was cast onto a polyester film, and dried at 85° C. for 2 hours, followed by further heat treatment in a nitrogen atmosphere at 100° C. for 1 hour, at 200° C. for 1 hour, and at 300° C. for 1 hour, thereby obtaining a membranous sample. Then, such a membranous sample was further heat treated in a nitrogen atmosphere at 450° C. for 1 hour, thereby obtaining a gas separation membrane (sample I).

The resulting gas separation membrane (sample I) was transparent and dark brown. Further, the thermogravimetric measurement (TGA measurement) was carried out under the same condition as in Example 1. As a result, the thermal decomposition temperature (5% weight loss temperature: $T_d^5$) was 513° C. Furthermore, the gas permeation measurement of sample I was carried out under the same condition as in Example 1. The measurement results thereof are shown in the following Table 1.

Comparative Example 13

To 1.5 g of the DMAc solution of the silane-modified anhydride-terminated straight-chain polyamic acid obtained in Comparative Example 10, 0.061 g of TMOS and 0.043 g of H₂O were added, followed by stirring at room temperature for 24 hours. Thereafter, this mixed solution was cast onto a polyester film, and dried at 85° C. for 2 hours, followed by further heat treatment in a nitrogen atmosphere at 100° C. for 1 hour, at 200° C. for 1 hour and at 300° C. for 1 hour, thereby obtaining a membranous sample. Then, such a membranous sample was further heat treated in a nitrogen atmosphere at 450° C. for 1 hour, thereby obtaining a gas separation membrane (sample m). In such a gas separation membrane (sample m), the silica amount (in terms of silicon dioxide) was 10% by weight.

The resulting gas separation membrane (sample m) was transparent and dark brown. Further, the thermogravimetric measurement (TGA measurement) was carried out under the same condition as in Example 1. As a result, the thermal decomposition temperature (5% weight loss temperature: $T_d^5$) was 519° C. Furthermore, the gas permeation measurement of sample m was carried out under the same condition as in Example 1. The measurement results thereof are shown in the following Table 1.

Figure 3:
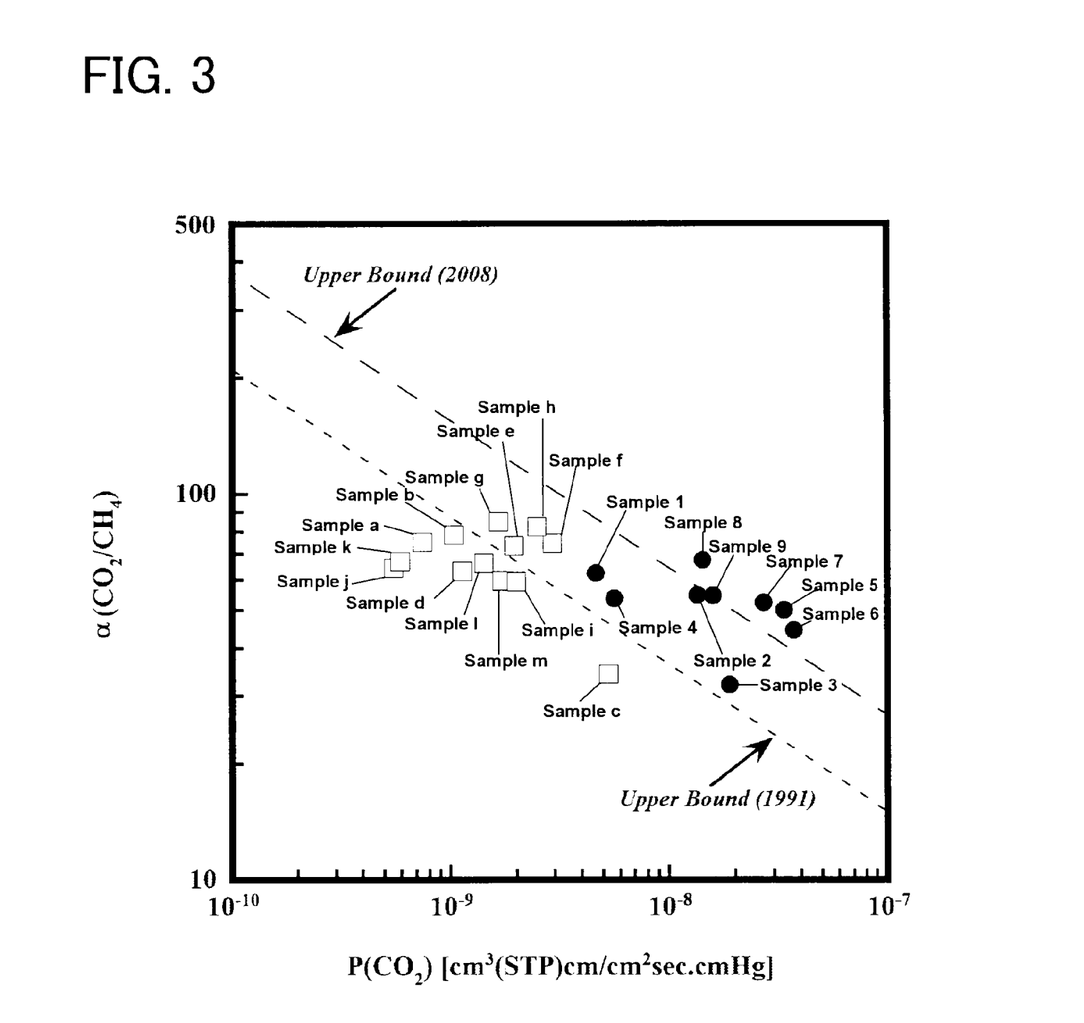
FIG. 3 is a graph in which the relationship between the $CO_2$ permeability coefficient $[P(CO_2)]$ and the $CO_2/CH_4$ separation factor $[\alpha(CO_2/CH_4)]$ is plotted for respective samples obtained in Examples.

In FIG. 3, there is shown the relationship between the $CO_2$ permeability coefficient [$P(CO_2)$] and the $CO_2/CH_4$ separation factor [$\alpha(CO_2/CH_4)$] in the respective samples, which were measured in Examples 1 to 9 and Comparative Examples 1 to 13. In FIG. 3, the dotted lines show upper bounds of the $CO_2/CH_4$ separation factor to the $CO_2$ permeability coefficient in polymer membranes, which were advocated by Robeson in 1991 and 2008.

TABLE 1

| | Sample | Gas Permeability Coefficient (P × 10$^{10}$ [cm$^3$(STP)cm/ cm$^2$ · sec · cmHg]) | | | | Separation Factor (α) | |
|---|---|---|---|---|---|---|---|
| | | $CO_2$ | $O_2$ | $N_2$ | $CH_4$ | $O_2/N_2$ | $CO_2/CH_4$ |
| Example 1 | 1 | 46.2 | 8.2 | 1.4 | 0.74 | 5.7 | 62 |
| Example 2 | 2 | 134 | 21.6 | 4.2 | 2.4 | 5.2 | 55 |
| Example 3 | 3 | 188 | 37.1 | 8.2 | 5.9 | 4.5 | 32 |
| Example 4 | 4 | 56.2 | 10.1 | 1.9 | 1.0 | 5.4 | 53 |
| Example 5 | 5 | 333 | 53 | 11 | 6.7 | 4.7 | 50 |
| Example 6 | 6 | 369 | 59 | 13 | 8.3 | 4.4 | 44 |
| Example 7 | 7 | 270 | 44 | 9.3 | 5.1 | 4.8 | 52 |
| Example 8 | 8 | 141 | 23 | 4.6 | 2.1 | 5.0 | 68 |
| Example 9 | 9 | 158 | 25 | 4.9 | 2.8 | 55 | 5.2 |
| Comparative Example 1 | a | 7.4 | 1.5 | 0.23 | 0.098 | 6.8 | 75 |
| Comparative Example 2 | b | 10 | 2.0 | 0.31 | 0.13 | 6.6 | 79 |
| Comparative Example 3 | c | 53 | 9.5 | 1.9 | 1.5 | 4.9 | 34 |
| Comparative Example 4 | d | 11 | 2.3 | 0.36 | 0.18 | 6.2 | 63 |
| Comparative Example 5 | e | 19 | 3.5 | 0.56 | 0.26 | 6.3 | 73 |
| Comparative Example 6 | f | 29 | 5.0 | 0.76 | 0.39 | 6.5 | 75 |
| Comparative Example 7 | g | 16 | 3.1 | 0.43 | 0.19 | 7.2 | 85 |
| Comparative Example 8 | h | 25 | 4.4 | 0.66 | 0.30 | 6.7 | 83 |
| Comparative Example 9 | i | 19 | 3.5 | 0.54 | 0.33 | 59 | 6.4 |
| Comparative Example 10 | j | 5.5 | 1.1 | 0.16 | 0.085 | 6.9 | 65 |
| Comparative Example 11 | k | 5.9 | 1.1 | 0.17 | 0.088 | 6.3 | 67 |
| Comparative Example 12 | l | 14.2 | 2.7 | 0.43 | 0.21 | 6.3 | 66 |
| Comparative Example 13 | m | 17.1 | 3.1 | 0.51 | 0.29 | 6.2 | 60 |

As is apparent from Table 1 and FIG. 1, it has been confirmed that the gas separation membranes (samples 1 to 9) of the present invention show a high $CO_2/CH_4$ separation factor exceeding the upper bound of polymer membranes which has hitherto been advocated. In particular, it has been confirmed that the gas separation membranes (samples 5 to 8) each obtained by heat treating the membranous precursor composed of the polymer blend of the hyperbranched polyimide and the straight-chain hydroxypolyimide or the membranous precursor composed of the polymer blend of the organic-inorganic polymer hybrid and the straight-chain hydroxypolyimide for partial carbonization show a very high $CO_2/CH_4$ separation factor that exceeds the upper bound of polymer membranes advocated by Robeson in 2008.

Compared with this, the $CO_2/CH_4$ separation factor of each of (1) the gas separation membranes (samples a to d, and i) each composed of the hyperbranched polyimide or the organic-inorganic polymer hybrid and not subjected to the heat treatment for partial carbonization, (2) the gas separation membranes (samples j and k) each composed of the straight-chain polyimide and not subjected to the heat treatment for partial carbonization, and further (3) the gas separation membranes (samples l and m) each obtained by heat treating the membranous precursor composed of the straight-chain polyimide or the straight-chain polyimide-silica hybrid for partial carbonization did not exceed even the upper bound of polymer membranes advocated by Robeson in 1991. Further, the $CO_2/CH_4$ separation factor in the gas separation membranes (samples e and g) each composed of the polymer blend of the hyperbranched polyimide and the straight-chain hydroxypolyimide and the gas separation membranes (samples f and h) each composed of the polymer blend of the organic-inorganic polymer hybrid and the straight-chain hydroxypolyimide exceeded the upper bound of polymer membranes advocated by Robeson in 1991, but did not exceed the upper bound of polymer membranes advocated by Robeson in 2008.

From the above results, it is revealed that in the gas separation membranes of the present invention, free-volume holes having a size effective for $CO_2/CH_4$ separation is easily formed by partial carbonization due to the hyperbranched structure thereof. In particular, it is revealed that the gas separation membrane obtained by heat treating the membrane composed of the hyperbranched polyimide-silica hybrid or the membrane composed of the polymer blend of the hyperbranched polyimide or the hyperbranched polyimide-silica hybrid and the straight-chain hydroxypolyimide for partial carbonization has permeability of $CO_2$ and separation characteristics of $CO_2$ and $CH_4$ at a very high level.

What is claimed is:

1. A gas separation membrane obtained by a process comprising:
    heat treating a membrane comprising a hyperbranched polyimide-based material in a non-oxidizing atmosphere,
    wherein the hyperbranched polyimide-based material comprises a hyperbranched polyimide obtained by imidizing a hyperbranched polyamic acid having a hydroxyl group or an alkoxy group at at least one of a plurality of ends thereof, the hyperbranched polyamic acid is obtained by reacting an aromatic tetracarboxylic dianhydride, an aromatic triamine and an alkoxy compound of silicon, magnesium, aluminum, zirconium or titanium, which has an amino group or a carboxyl group at an end, or a derivative of the alkoxy compound, and the hyperbranched polyimide-based material is a polymer blend of the hyperbranched polyimide and a straight-chain hydroxypolyimide.

2. The gas separation membrane according to claim 1, wherein the straight-chain hydroxypolyimide is obtained by polymerizing an aromatic tetracarboxylic dianhydride and 3,3'-dihydroxybenzidine.

3. The gas separation membrane according to claim 1, wherein the membrane undergoes the heat treating in a temperature range of from 300° C. to 500° C.

4. The gas separation membrane according to claim 1, wherein the membrane undergoes the heat treating in an inert gas atmosphere.

5. The gas separation membrane according to claim 1, wherein the membrane undergoes the heat treating under reduced pressure including vacuum.

6. The gas separation membrane according to claim 1, wherein he membrane undergoes the heat treating in a temperature range of from 300° C. to 500° C. for a heating time in a range of from 30 minutes to 2 hours.

7. A gas separation membrane obtained by a process comprising:
    heat treating a membrane comprising a hyperbranched polyimide-based material in a non-oxidizing atmosphere,
    wherein the hyperbranched polyimide-based material comprises an organic-inorganic polymer hybrid having a composite structure which is obtained by integrating a hyperbranched polyimide moiety and an inorganic oxide moiety through covalent bond, the hyperbranched polyimide moiety having an imide structure which is produced by a reaction of an aromatic tetracarboxylic dianhydride and an aromatic triamine, and the hyperbranched polyimide-based material is a polymer blend of the organic-inorganic polymer hybrid and a straight-chain hydroxypolyimide.

8. The gas separation membrane according to claim 7, wherein the organic-inorganic polymer hybrid is obtained by imidization of a reaction product which is obtained by sol-gel reaction, in the presence of water, of a hyperbranched polyamic acid having a hydroxyl group or an alkoxy group at at least one of a plurality of ends thereof and at least one of alkoxides.

9. The gas separation membrane according to claim 7, wherein the organic-inorganic polymer hybrid is obtained by imidization of a reaction product which is obtained by sol-gel reaction, in the presence of water, of a hyperbranched polyamic acid having a hydroxyl group or an alkoxy group at at least one of a plurality of ends thereof and at least one of alkoxides, and the hyperbranched polyamic acid is obtained by reacting an aromatic tetracarboxylic dianhydride, an aromatic triamine, and an alkoxy compound or a derivative of the alkoxy compound.

10. The gas separation membrane according to claim 7, wherein the organic-inorganic polymer hybrid is obtained by imidization of a reaction product which is obtained by sol-gel reaction, in the presence of water, of a hyperbranched polyamic acid having a hydroxyl group or an alkoxy group at at least one of a plurality of ends thereof and at least one of alkoxides represented by $R^1{}_m M(OR^2)_n$, where $R^1$ and $R^2$ independently represent a hydrocarbon group, M represents one of Si, Mg, Al, Zr, and Ti, m represents zero or a positive integer, n represents a positive integer, and m+n represents a valence of M.

11. The gas separation membrane according to claim 7, wherein the organic-inorganic polymer hybrid is obtained by imidization of a reaction product which is obtained by sol-gel reaction, in the presence of water, of a hyperbranched polyamic acid having a hydroxyl group or an alkoxy group at at least one of a plurality of ends thereof and at least one of alkoxides represented by $R^1{}_m M(OR^2)_n$, where $R^1$ and $R^2$ independently represent a hydrocarbon group, M represents one of Si, Mg, Al, Zr, and Ti, m represents zero or a positive integer, n represents a positive integer, and m+n represents a valence of M, and the hyperbranched polyamic acid is obtained by reacting an aromatic tetracarboxylic dianhydride, an aromatic triamine and an alkoxy compound of silicon, magnesium, aluminum, zirconium or titanium, which has an amino group or a carboxyl group at an end, or a derivative of the alkoxy compound.

12. The gas separation membrane according to claim 7, wherein the organic-inorganic polymer hybrid is obtained by imidization of a reaction product which is obtained by sol-gel reaction, in the presence of water, of a hyperbranched polyamic acid having a hydroxyl group or an alkoxy group at at least one of a plurality of ends thereof and at least one of alkoxides represented by $R^1{}_m M(OR^2)_n$, where $R^1$ and $R^2$ independently represent a hydrocarbon group, M represents one of Si, Mg, Al, Zr, and Ti, m represents zero or a positive integer, n represents a positive integer, and m+n represents a valence of M, and the hyperbranched polyamic acid is obtained by reacting an aromatic tetracarboxylic dianhydride, an aromatic triamine and an alkoxy compound or a derivative of the alkoxy compound.

13. The gas separation membrane according to claim 7, wherein the straight-chain hydroxypolyimide is obtained by polymerizing an aromatic tetracarboxylic dianhydride and 3,3'-dihydroxybenzidine.

14. The gas separation membrane according to claim 7, wherein the membrane undergoes the heat treating in a temperature range of from 300° C. to 500° C.

15. The gas separation membrane according to claim 7, wherein the membrane undergoes the heat treating in an inert gas atmosphere.

16. The gas separation membrane according to claim 7, wherein the membrane undergoes the heat treating under reduced pressure including vacuum.

17. The gas separation membrane according to claim 8, wherein the sol-gel reaction is in a temperature range of from 100° C. or lower.

18. The gas separation membrane according to claim 8, wherein the membrane has an inorganic oxide resulted from at least one of the alkoxides, and the membrane has the inorganic oxide in an amount in a range of from of 0.05% by weight to 95% by weight.

19. The gas separation membrane according to claim 8, wherein the membrane has an inorganic oxide resulted from at least one of the alkoxides, and the membrane has the inorganic oxide in an amount in a range of from 0.1% by weight to 50% by weight.

20. The gas separation membrane according to claim 7, wherein the membrane undergoes the heat treating in a temperature range of from 300° C. to 500° C. for a heating time in a range of from 30 minutes to 2 hours.

* * * * *